United States Patent
Ohori

(10) Patent No.: US 11,901,779 B2
(45) Date of Patent: Feb. 13, 2024

(54) MOTOR AND BRUSHLESS WIPER MOTOR

(71) Applicant: MITSUBA Corporation, Gunma (JP)

(72) Inventor: Ryo Ohori, Gunma (JP)

(73) Assignee: MITSUBA Corporation, Gunma (JP)

( * ) Notice: Subject to any disclaimer, the term of this patent is extended or adjusted under 35 U.S.C. 154(b) by 703 days.

(21) Appl. No.: 17/042,179

(22) PCT Filed: Mar. 22, 2019

(86) PCT No.: PCT/JP2019/012028
§ 371 (c)(1),
(2) Date: Sep. 27, 2020

(87) PCT Pub. No.: WO2019/198462
PCT Pub. Date: Oct. 17, 2019

(65) Prior Publication Data
US 2021/0028678 A1    Jan. 28, 2021

(30) Foreign Application Priority Data

Apr. 12, 2018 (JP) .................................. 2018-076678

(51) Int. Cl.
*H02K 21/14* (2006.01)
*H02K 1/27* (2022.01)
*H02K 1/278* (2022.01)

(52) U.S. Cl.
CPC ............... *H02K 21/14* (2013.01); *H02K 1/27* (2013.01); *H02K 1/278* (2013.01)

(58) Field of Classification Search
CPC .......... H02K 21/14; H02K 21/16; H02K 1/27; H02K 1/278; H02K 7/1166
See application file for complete search history.

(56) References Cited

U.S. PATENT DOCUMENTS 5,998,904 A    12/1999 Hattori
6,034,458 A *  3/2000 Uetake .................. H02K 21/14
                                                        310/156.49
(Continued)

FOREIGN PATENT DOCUMENTS

DE    202016105231    1/2017
EP        2626977     8/2013
(Continued)

OTHER PUBLICATIONS

Office Action of China Counterpart Application, with English translation thereof, dated Aug. 24, 2022, pp. 1-14.
(Continued)

*Primary Examiner* — Jeremy A Luks
(74) *Attorney, Agent, or Firm* — JCIPRNET

(57) ABSTRACT

A motor includes: a stator having teeth protruding radially inward from the inner peripheral surface of a stator core; coils wound on the teeth; a shaft rotating on the inside radially of the stator core; a rotor core affixed to the shaft and radially centered on the rotation axis of the shaft; permanent magnets arranged on the outer peripheral surface of the rotor core; projecting poles which are formed projecting radially outward between the permanent magnets adjacent to each other in the circumferential direction of the outer peripheral surface of the rotor core, and with which the projecting contact surfaces of the permanent magnets are in contact. The stator is formed by stacking electromagnetic steel sheets in the direction of the rotation axis of the shaft. At least one of the axial ends of each of the permanent magnets projects further than an axial end of the rotor core.

20 Claims, 11 Drawing Sheets

(56) References Cited

U.S. PATENT DOCUMENTS

| | | | | |
|---|---|---|---|---|
| 7,202,585 | B2* | 4/2007 | Ohata | H02K 1/278 310/156.43 |
| 7,741,747 | B2* | 6/2010 | Yamamura | H02K 1/2781 310/156.01 |
| 7,888,835 | B2* | 2/2011 | Yang | H02K 1/2773 310/156.19 |
| 8,829,753 | B2* | 9/2014 | Maruyama | H02K 1/2753 310/156.19 |
| 9,515,528 | B2* | 12/2016 | Yamaguchi | H02K 21/14 |
| 11,289,960 | B2* | 3/2022 | Ohori | H02K 1/278 |
| 11,496,031 | B2* | 11/2022 | Ohori | H02K 21/16 |
| 2002/0135252 | A1 | 9/2002 | Burton | |
| 2009/0033174 | A1 | 2/2009 | Niguchi et al. | |
| 2010/0244607 | A1* | 9/2010 | Fujimoto | H02K 1/2781 310/156.31 |
| 2012/0139372 | A1* | 6/2012 | Nakano | H02K 1/148 310/156.01 |
| 2016/0254713 | A1 | 9/2016 | Yamaguchi et al. | |
| 2022/0060069 | A1* | 2/2022 | Ohori | H02K 1/278 |

FOREIGN PATENT DOCUMENTS

| | | |
|---|---|---|
| EP | 2830192 | 1/2015 |
| EP | 3051672 | 8/2016 |
| FR | 2873513 | 1/2006 |
| JP | 2000184637 | 6/2000 |
| JP | 2000333429 | 11/2000 |
| JP | 2002262533 | 9/2002 |
| JP | 2004048970 | 2/2004 |
| JP | 2006333657 | 12/2006 |
| JP | 2008199833 | 8/2008 |
| JP | 2008245406 | 10/2008 |
| JP | 2009033927 | 2/2009 |
| JP | 2016175638 | 10/2016 |
| WO | 2006118219 | 11/2006 |
| WO | 2014167645 | 10/2014 |
| WO | 2017002873 | 1/2017 |

OTHER PUBLICATIONS

"Written Opinion of the International Searching Authority (Form PCT/ISA/237) of PCT/JP2019/012028," dated Apr. 23, 2019, with English translation thereof, pp. 1-12.

"Office Action of Japan Counterpart Application", dated Nov. 16, 2021, with English translation thereof, p. 1-p. 11.

"Search Report of Europe Counterpart Application", dated Nov. 29, 2021, pp. 1-9.

"International Search Report (Form PCT/ISA/210) of PCT/JP2019/012028," dated Apr. 23, 2019, with English translation thereof, pp. 1-4.

* cited by examiner

MOTOR AND BRUSHLESS WIPER MOTOR

CROSS-REFERENCE TO RELATED APPLICATION

This application is a 371 application of the International PCT application serial no. PCT/JP2019/012028, filed on Mar. 22, 2019, which claims the priority benefit of Japan Patent Application No. 2018-076678, filed on Apr. 12, 2018. The entirety of each of the above-mentioned patent applications is hereby incorporated by reference herein and made a part of this specification.

TECHNICAL FIELD

The present invention relates to a motor and a brushless wiper motor.

DESCRIPTION OF RELATED ART

A brushless motor (also referred to hereinafter simply as a motor) includes a stator having teeth around which coils are wound, and a rotor rotatably provided inside the stator in a radial direction thereof. Slots are formed between the teeth that are adjacent to each other in a circumferential direction thereof. The coils are wound around each of the teeth through these slots. The stator and the rotor are formed by stacking electromagnetic steel sheets in a direction of a rotation axis of a shaft (also referred to hereinafter simply as an axial direction), or by pressure-molding soft magnetic powder.

An interlinking magnetic flux is formed in the stator by supplying electric power to the coil. The rotor has the shaft, a substantially cylindrical rotor core that is externally fitted and fixed to the shaft, and permanent magnets provided on the rotor core. In addition, magnetic attractive and repulsive forces are generated between the interlinking magnetic flux formed in the stator and the permanent magnets provided in the rotor core, whereby the rotor continuously rotates.

Here, examples of a type based on disposition of permanent magnets on a rotor include a type in which permanent magnets are disposed on an outer peripheral surface of a rotor core (surface permanent magnet (SPM)). Various methods for achieving high torque with this SPM type rotor have been proposed.

For example, a technique of forming an axial thickness of a rotor to be thicker than an axial thickness of a stator has been proposed (for example, as shown in Patent Literature 1).

With this configuration, both axial ends of permanent magnets of the rotor from which a magnetic flux of the permanent magnets easily leaks can be positioned outward from both axial ends of the stator. For this reason, an amount of effective magnetic flux of the rotor increases, and an interlinking magnetic flux formed in the stator can efficiently contribute to a rotation force of the rotor.

Further, for example, a rotor has been proposed in which, on an outer peripheral surface of a rotor core, projecting poles that project outward in a radial direction thereof are provided between permanent magnets that are adjacent to each other in a circumferential direction thereof (see, for example, Patent Literature 2). By providing the projecting poles, in the rotor core, a direction in which an interlinking magnetic flux (q axis magnetic flux) formed by coils of a stator easily flows and a direction in which the interlinking magnetic flux does not easily flow (d axis direction) are formed. As a result, a reluctance torque is generated in the rotor core, and this reluctance torque can also contribute to a rotation force of the rotor.

REFERENCE LIST

Patent Literature

Patent Literature 1: Japanese Patent Laid-Open No. 2006-333657
Patent Literature 2: Japanese Patent Laid-Open No. 2002-262533

SUMMARY

Technical Problem

However, in Patent Literature 1 described above, magnetic fluxes at the portion of the permanent magnets that project from both axial ends of the stator leak to both axial ends of the stator. This will be described in detail below.

FIG. 16 is a plan view of a part of a stator 108 viewed in an axial direction thereof.

As shown in FIG. 16, even in a case in which electromagnetic steel sheets Pt are stacked to form the stator 108, both axial ends 108a of the stator 108 are one electromagnetic steel sheet Pt when viewed in the axial direction. For this reason, in a case in which a magnetic flux flows from an outside in the axial direction to the stator 108, electric resistance of the stator 108 with respect to this magnetic flux is low. Therefore, at both axial ends 108a of the stator 108, an eddy current Du is easily generated by the magnetic flux flowing from the outside in a direction of a rotation axis, and thus iron loss of the stator may increase.

FIG. 17 is a side view of the stator 108 viewed in a radial direction thereof.

As shown in FIG. 17, as compared with FIG. 16, in the case in which the electromagnetic steel sheets Pt are stacked to form the stator 108, the electric resistance of the stator 108 increases with respect to magnetic fluxes in the radial direction. For this reason, the eddy current Du is not easily generated.

Further, when the projecting poles are provided on the rotor core as in Patent Literature 2 described above, magnetic fluxes of permanent magnets leak to these projecting poles, and the magnetic fluxes are formed in the projecting poles. For this reason, since an order of a cogging torque of a motor is usually determined on the basis of the least common multiple of "the number of magnetic poles of permanent magnets×the number of teeth (the number of slots)," the order may be twice the least common multiple. This will be described in more detail below.

FIG. 18 is a graph showing a change in surface magnetic flux density in Patent Literature 2 in which the vertical axis represents a surface magnetic flux density of the rotor and the horizontal axis represents a rotation angle of the rotor.

As shown in section X in FIG. 18, it can be confirmed that a magnetic flux is formed in the projecting pole and a change in magnetic flux at this projecting pole is larger. For this reason, the order of the cogging torque may increase, and thus the iron loss of the stator may increase.

In particular, when the projecting poles of the rotor core and both axial ends of the permanent magnets project further than both axial ends of the stator, the magnetic fluxes of the projecting poles flow from the outside in the axial direction to both axial ends of the stator. For this reason, the order of the cogging torque may increase, and thus the iron loss of the stator may increase.

Therefore, the present invention provides a motor and a brushless wiper motor in which iron loss of a stator can be inhibited to improve motor efficiency.

Solution to Problem

In order to solve the above problems, a motor according to the present invention is characterized by including: a stator which has an annular stator core, and a plurality of teeth protruding radially inward from an inner circumferential surface of the stator core; coils which are wound around the teeth; a shaft which rotates inside the stator core in a radial direction thereof; a rotor core which is affixed to the shaft and radially centered on a rotation axis of the shaft; a plurality of permanent magnets disposed on an outer peripheral surface of the rotor core; and projecting poles which are formed to project radially outward between the permanent magnets adjacent to each other in a circumferential direction of the outer peripheral surface of the rotor core and with which circumferential side surfaces of the permanent magnets are brought into contact, in which the stator is formed by stacking a plurality of electromagnetic steel sheets in a direction of the rotation axis of the shaft, and at least one end portion of both ends of each permanent magnet in the direction of the rotation axis projects further than an end portion of the rotor core in the direction of the rotation axis.

By stacking the electromagnetic steel sheets in the axial direction as described above, electric resistance of the stator can be increased with respect to magnetic fluxes of the projecting poles in the radial direction. For this reason, eddy currents of the stator can be reduced with respect to the magnetic fluxes of the projecting poles in the radial direction. Therefore, iron loss of the stator can be inhibited and thus motor efficiency can be improved.

Further, by causing at least one end portion of both axial ends of each permanent magnet to project further than an end portion of the rotor core, it is possible to prevent a magnetic flux on one end side of the permanent magnet from leaking to the projecting pole. For this reason, occurrence of a large eddy current in at least one end of both axial ends of the stator due to the projecting pole can be inhibited. Therefore, iron loss of the stator can be inhibited and thus motor efficiency can be improved.

In addition, when one axial end of the permanent magnet is projected further outward in the axial direction than one axial end of the stator, an amount of effective magnetic flux of the rotor can be increased. For this reason, an interlinking magnetic flux formed in the stator can be caused to efficiently contribute to a rotation force of the rotor. Therefore, motor efficiency can be improved.

Also, the motor according to the present invention is characterized in that a thickness of the stator in the direction of the rotation axis and a thickness of the rotor core in the direction of the rotation axis are the same.

With this configuration, leakage of magnetic fluxes at both ends of the projecting pole to both ends of the stator can be reliably inhibited. For this reason, iron loss of the stator can be reliably inhibited, and thus motor efficiency can be reliably increased.

In the motor according to the present invention, when the thickness of the stator in the direction of the rotation axis is defined as $T_s$, the thickness of the rotor core in the direction of the rotation axis is defined as $T_r$, and a thickness of the permanent magnet in the direction of the rotation axis is defined as $T_m$, the thicknesses $T_s$, $T_r$, and $T_m$ are set to satisfy a correlation of $T_m > T_r > T_s$.

With this configuration, the interlinkage magnetic flux formed in the stator can be caused to efficiently contribute to the rotation force of the rotor while leakage of the magnetic fluxes of both ends of the projecting pole to both ends of the stator can be inhibited. Therefore, motor efficiency can be further increased.

In the motor according to the present invention, a circumferential width dimension of a radially outer end portion of the projecting pole is 40 degrees or less in electrical angle.

An inductance value in a direction of q axis can be reduced by setting the electrical angle of the projecting pole to 40 degrees or less and reducing the circumferential width dimension of the projecting pole as described above.

Here, since the interlinkage magnetic flux formed in the stator easily passes through the projecting pole, the interlinkage magnetic flux may also pass through the circumferential side surface of the permanent magnet that is brought into contact with the projecting pole. That is, a demagnetizing field is generated on the circumferential side surface of the permanent magnet. However, the demagnetizing field can be inhibited by setting the electrical angle of the projecting pole to 40 degrees or less.

In the motor according to the present invention, the circumferential width dimension of the radially outer end portion of the projecting pole is 20 degrees or more in electrical angle.

With this configuration, the width dimension of the projecting poles in the circumferential direction is ensured to be 20 degrees or more in electrical angle so that an effect of causing the demagnetizing field not to easily act on the end portion of the permanent magnet can be obtained by concentrating the magnetic flux on the projecting pole. Further, by setting the electrical angle of the projecting pole to 20 degrees or more and 40 degrees or less, a high reluctance torque can be obtained and thus motor efficiency can be improved.

The motor according to the present invention is characterized in that one groove portion is formed on a radially outer end surface of the projecting pole in the direction of the rotation axis, and the groove portion is formed such that a circumferential groove width thereof becomes gradually narrower toward an inner side in the radial direction.

With this configuration, the groove portion is provided on the radially outer end surface of the projecting pole so that a gap between the end surface and the teeth can be made uneven when the entire radially outer end surface of the projecting pole is viewed. As a result, a sudden change in magnetic flux density generated in the teeth before and after the projecting poles pass between the teeth can be inhibited during rotation of the rotor core. For this reason, abrupt torque fluctuation of the rotor core can be reduced, and thus torque ripple can be reduced.

A brushless wiper motor according to the present invention is characterized by including the motor described above.

With this configuration, it is possible to provide a brushless wiper motor in which iron loss of the stator can be inhibited to improve motor efficiency.

Advantageous Effects of Invention

According to the present invention, the electric resistance of the stator can be increased with respect to the magnetic fluxes of the projecting poles in the radial direction by stacking the electromagnetic steel sheets in the axial direction. For this reason, eddy currents of the stator can be reduced with respect to the magnetic fluxes of the projecting poles in the radial direction. Therefore, iron loss of the stator can be inhibited and thus motor efficiency can be improved.

Further, by making at least one end portion of both axial ends of the permanent magnet project further than the end portion of the rotor core, it is possible to prevent the magnetic flux on the one end side of the permanent magnet from leaking to the projecting pole. For this reason, occurrence of a large eddy current in at least one end of both axial ends of the stator due to the projecting pole can be prevented. Therefore, iron loss of the stator can be inhibited and thus motor efficiency can be improved.

In addition, when one axial end of the permanent magnet is caused to project axially outward further than one axial end of the stator, an amount of effective magnetic flux of the rotor can be increased. For this reason, the interlinking magnetic flux formed in the stator can be caused to efficiently contribute to the rotation force of the rotor. Therefore, motor efficiency can be improved.

DESCRIPTION OF THE EMBODIMENTS

Next, an embodiment of the present invention will be described with reference to the drawings.

(Wiper Motor)

Figure 1:
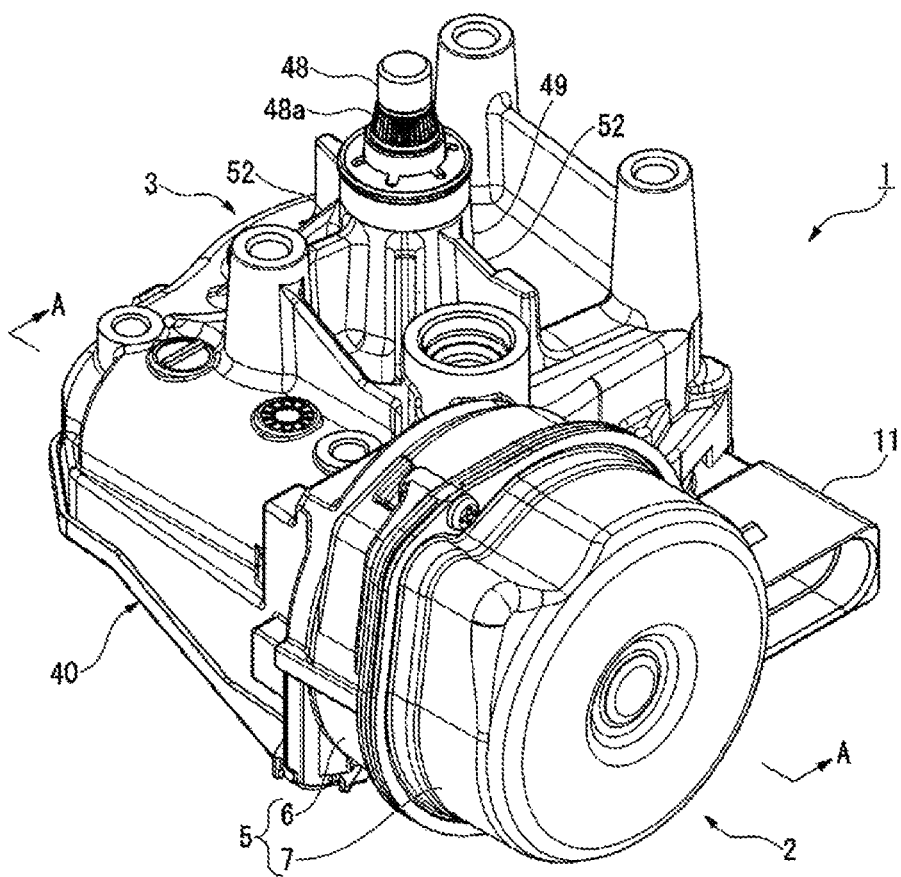
FIG. 1 is a perspective view of a wiper motor according to an embodiment of the present invention.
Figure 2:
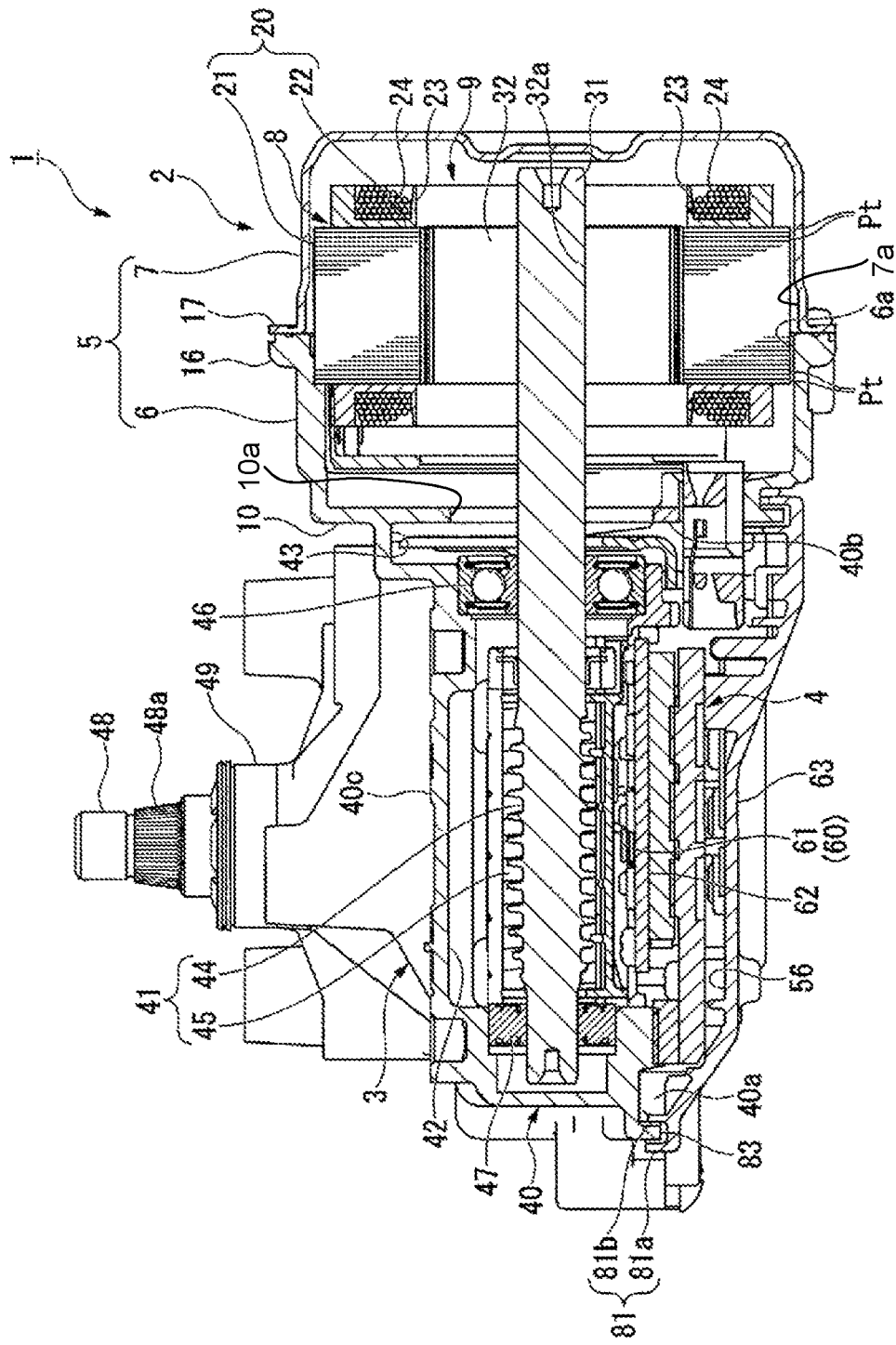
FIG. 2 is a cross-sectional view along line A-A in FIG. 1

FIG. 1 is a perspective view of a wiper motor 1. FIG. 2 is a cross-sectional view along line A-A in FIG. 1.

As shown in FIGS. 1 and 2, the wiper motor 1 serves as a drive source of a wiper mounted on a vehicle, for example. The wiper motor 1 includes a motor unit 2, a reduction gear unit 3 that decelerates and outputs rotation of the motor unit 2, and a controller unit 4 that controls driving of the motor unit 2.

Also, in the following description, the simple description "axial direction" refers to a direction of a rotation axis of a shaft 31 of the motor unit 2, the simple description "circumferential direction" refers to a circumferential direction of the shaft 31, and the simple description "radial direction" refers to a radial direction of the shaft 31.

(Motor Unit)

The motor unit 2 includes a motor case 5, a substantially cylindrical stator 8 accommodated in the motor case 5, and a rotor 9 which is provided radially inside the stator 8 and is provided to be rotatable with respect to the stator 8. The motor unit 2 is a so-called brushless motor that does not require a brush at the time of supplying electric power to the stator 8.

(Motor Case)

The motor case 5 is formed of a material having excellent heat dissipation, such as aluminum die cast. The motor case 5 includes a first motor case 6 and a second motor case 7 which are configured to be axially separable from each other. The first motor case 6 and the second motor case 7 are each formed in a bottomed tubular shape.

The first motor case 6 is formed integrally with a gear case 40 of a reduction gear unit 3 such that a bottom portion 10 thereof is joined to the gear case 40. A through hole 10a into which the shaft 31 of the rotor 9 can be inserted is formed at substantially the center of the bottom portion 10 in the radial direction.

Further, an outer flange portion 16 that protrudes outward in the radial direction is formed in an opening portion 6a of the first motor case 6, and an outer flange portion 17 that protrudes outward in the radial direction is formed in an opening portion 7a of the second motor case 7. These outer flange portions 16 and 17 engage with each other to form the motor case 5 having an internal space. In addition, the stator 8 is disposed in the internal space of the motor case 5 to be fitted into the first motor case 6 and the second motor case 7.

(Stator)

Figure 3:
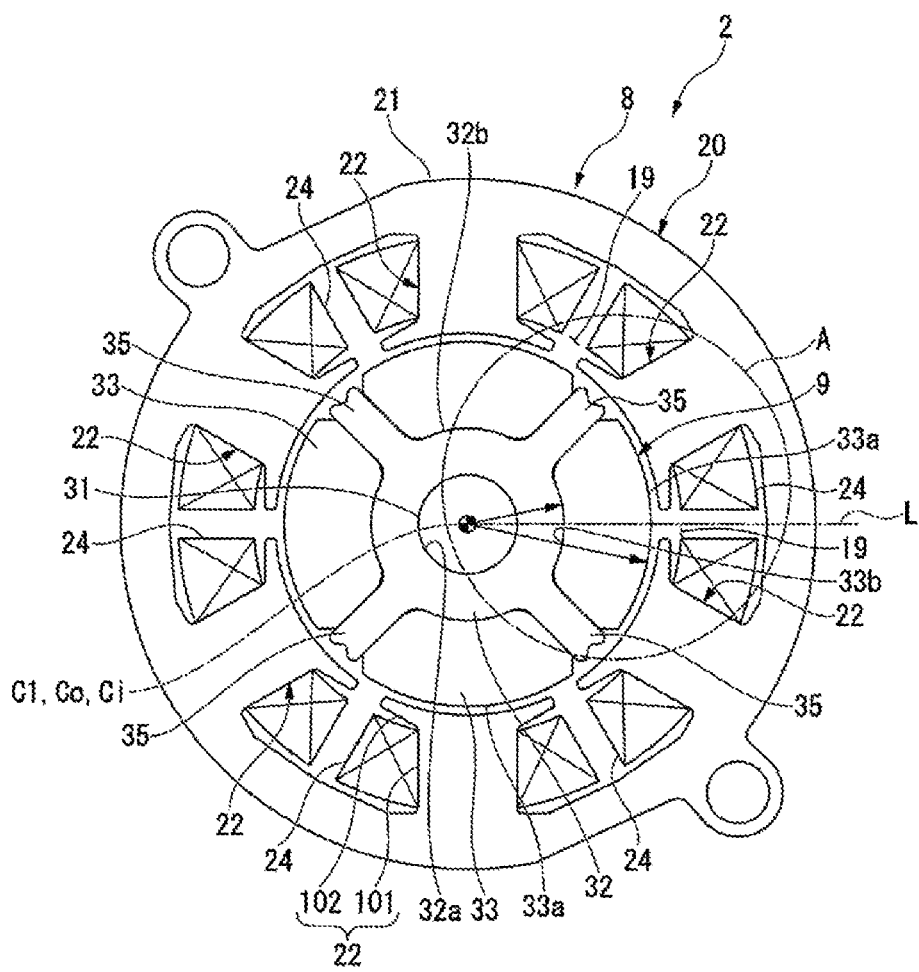
FIG. 3 is a configuration diagram of a stator and a rotor in the embodiment of the present invention.

FIG. 3 shows a configuration of the stator 8 and the rotor 9, and corresponds to a diagram viewed in the axial direction.

As shown in FIGS. 2 and 3, the stator 8 has a stator core 20 in which a tubular core portion 21 having a substantially circular cross-sectional shape in the radial direction, and a plurality of teeth 22 protruding inward from the core portion 21 in the radial direction (for example, six in the present embodiment) are formed integrally with each other.

The stator core 20 is formed by stacking a plurality of electromagnetic steel sheets Pt in the axial direction.

Each of the teeth 22 is formed by integrally molding a tooth body 101 that protrudes from an inner circumferential surface of the core portion 21 in the radial direction, and collar portions 102 that extend from a radially inner end of the tooth body 101 in the circumferential direction. The collar portions 102 are formed to extend from the tooth body 101 to both sides in the circumferential direction. In addition, slots 19 are formed between the collar portions 102 that are adjacent to each other in the circumferential direction.

Also, the inner circumferential surface of the core portion 21 and the teeth 22 are covered with an insulator 23 made of a resin. Coils 24 are wound around each of the teeth 22 from above the insulator 23. Each coil 24 generates a magnetic field for rotating the rotor 9 when electric power is supplied from the controller unit 4.

(Rotor)

Figure 4:
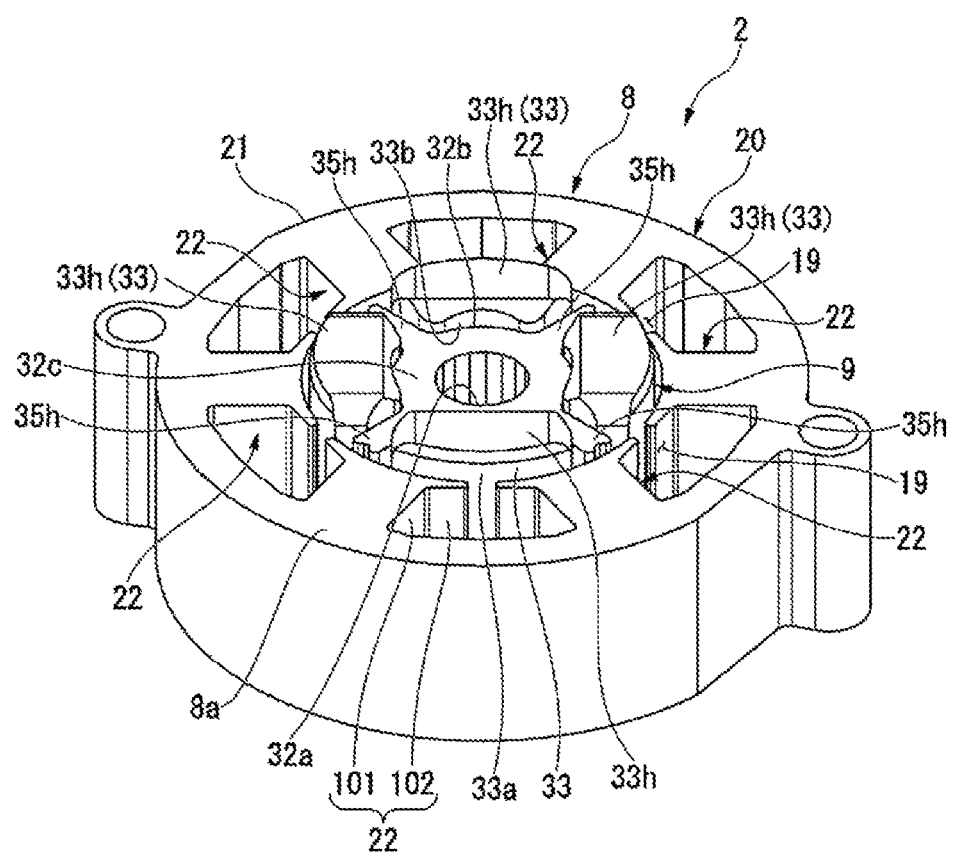
FIG. 4 is a perspective view of the stator and the rotor.
Figure 5:
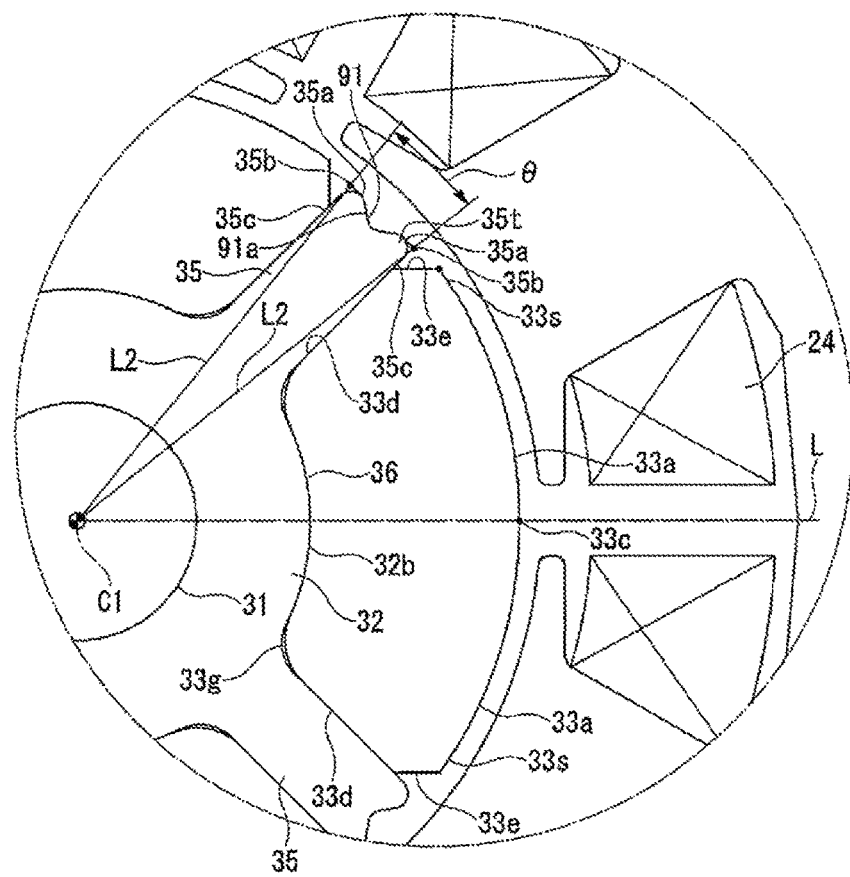
FIG. 5 is an enlarged view of part A in FIG. 3.

FIG. 4 is a perspective view of the stator 8 and the rotor 9. FIG. 5 is an enlarged view of part A in FIG. 3. Also, in FIG. 4, the insulator 23 provided on the stator 8 and the coils 24 wound around the stator 8 are omitted for easy understanding.

As shown in FIGS. 3 to 5, the rotor 9 is rotatably provided inside the stator 8 in the radial direction with a minute gap therebetween. The rotor 9 includes the shaft 31 integrally formed with a worm shaft 44 (see FIG. 2) that constitutes the reduction gear unit 3, a substantially column-shaped rotor core 32 that is externally fitted and affixed to the shaft 31 and has the shaft 31 as an axis (rotation axis) C. and four permanent magnets 33 provided on an outer peripheral surface 32b of the rotor core 32.

In this way, in the motor unit 2, a ratio between the number of magnetic poles of the permanent magnets 33 and the number of slots 19 (teeth 22) is 2:3. Also, for the permanent magnet 33, for example, a ferrite magnet is used. However, the permanent magnet 33 is not limited thereto and a neodymium bond magnet or a neodymium sintered magnet may be adopted instead of the ferrite magnet.

The rotor core 32 is formed by stacking a plurality of electromagnetic steel sheets in the axial direction. The rotor core 32 is not limited to the case of being formed by a plurality of electromagnetic steel sheets being stacked in the axial direction, and may be formed by press-molding soft magnetic powder, for example.

In addition, a through hole 32a penetrating in the axial direction is formed substantially in the center of the rotor core 32 in the radial direction. The shaft 31 is press-fitted into the through hole 32a. The shaft 31 may be inserted into the through hole 32a, and the rotor core 32 may be externally fitted and affixed to the shaft 31 using an adhesive or the like.

Further, four projecting poles 35 are provided on the outer peripheral surface 32b of the rotor core 32 at equal intervals in the circumferential direction. The projecting poles 35 are formed to project radially outward and fully extend in the axial direction of the rotor core 32. Round chamfers 35a are formed on radially outer sides of the projecting poles 35 and at corner portions on both sides in the circumferential direction.

Further, a circumferential width dimension of the projecting pole 35 at a radially outer end portion 35t is 20 degrees or more and 40 degrees or less in electrical angle θ. Also, the circumferential width dimension of the radially outer end portion 35t of the projecting pole 35 is a width dimension between both circumferential corner portions 35b (hereinafter referred to as radial corner portions 35b of the projecting pole 35) when round chamfered portions 35a are not formed on the projecting pole 35. In the following description, the circumferential width dimension of the radially outer end portion 35t of the projecting pole 35 will be simply referred to as a circumferential width dimension of the projecting pole 35.

Also, the projecting poles 35 are formed such that both side surfaces 35c facing each other in the circumferential direction are parallel to each other. That is, the projecting pole 35 is formed such that the circumferential width dimension is uniform in the radial direction.

Further, in the radially outer end portion 35t of the projecting pole 35, one groove portion 91 is formed at substantially the center in the circumferential direction over the entire axial direction. The groove portion 91 is formed in substantially a V groove shape such that a groove width thereof in the circumferential direction becomes gradually narrower toward the inner side in the radial direction.

The outer peripheral surface 32b of the rotor core 32 formed in this manner is configured such that intervals between two projecting poles 35 adjacent to each other in the circumferential direction serve as magnet housing portions 36. The permanent magnets 33 are disposed in each of the magnet housing portions 36, and are affixed to the rotor core 32 with, for example, an adhesive agent.

In the permanent magnet 33, an arc center Co of an outer peripheral surface 33a thereof on an outer side in the radial direction and an arc center Ci of an inner circumferential surface 33b thereof on an inner side in the radial direction coincide with a position of the axial center C1 of the shaft 31. Further, a diameter of a circle passing through the end portion 35t of the projecting pole 35 and a diameter of the outer peripheral surface 33a of the permanent magnet 33 are the same.

The entire inner circumferential surface 33b of the permanent magnet 33 is in contact with the outer peripheral surface 32b of the rotor core 32. Further, both circumferential side surfaces of the permanent magnet 33 are formed by a projecting pole contact surface 33d that is positioned on the inner side in the radial direction and is brought into contact with the side surface 35c of the projecting pole 35 and an inclined surface 33e that is positioned further outward in the radial direction than the projecting pole contact surface 33d, which are smoothly connected to each other. The projecting pole contact surface 33d is smoothly connected to the inner circumferential surface 33b via an arcuate surface 33g.

The inclined surface 33e is formed to be oblique and flat such that it gradually separates from the projecting pole 35 from a radially outer end of the projecting pole contact surface 33d toward the outer peripheral surface 33a of the permanent magnet 33. In one permanent magnet 33, the inclined surfaces 33e on both sides in the circumferential direction are parallel to a straight line L connecting a circumferential intermediate portion 33c of the permanent magnet 33 and the axial center C1 of the shaft 31. For this reason, the two inclined surfaces 33e are also parallel to each other.

Further, the permanent magnet 33 is magnetized such that an orientation of magnetization (magnetic field) becomes parallel orientation along a thickness direction thereof. The permanent magnets 33 are disposed such that magnetic poles thereof differ from each other in the circumferential direction. For this reason, the projecting poles 35 of the rotor core 32 are positioned between the permanent magnets 33 adjacent to each other in the circumferential direction, that is, at boundaries (pole boundaries) of the magnetic poles.

Figure 6:
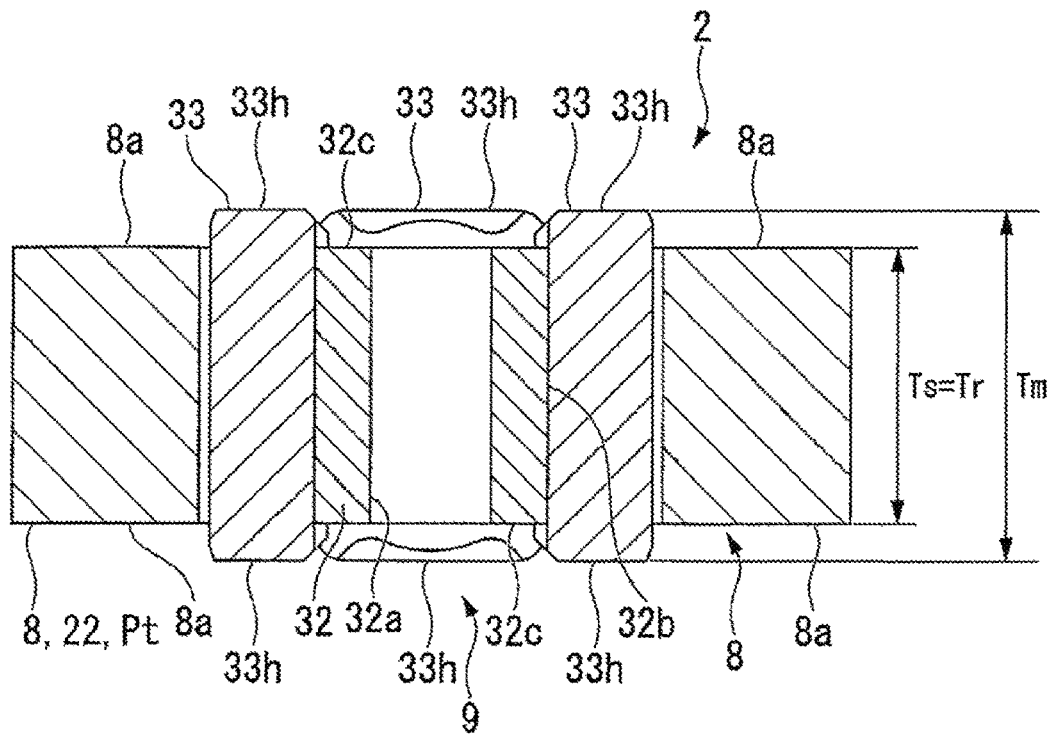
FIG. 6 is a cross-sectional view in an axial direction of the stator and the rotor in the embodiment of the present invention.

FIG. 6 is a cross-sectional view along the axial direction of the stator 8 and the rotor 9.

Here, as shown in FIG. 6, when an axial thickness of the stator 8 is defined as Ts, an axial thickness of the rotor core 32 is defined as Tr. and an axial thickness of the permanent magnet 33 is defined as Tm, the thicknesses Ts, Tr, and Tm are set to satisfy the following equation.

$$Tm > Tr \approx Ts \qquad (1)$$

Thus, both axial ends 33h of the permanent magnet 33 project further outward in the axial direction than both axial ends 32c of the rotor core 32 (the projecting poles 35) and both axial ends 8a of the stator 8.

(Reduction Gear Unit)

Returning to FIGS. 1 and 2, the reduction gear unit 3 includes a gear case 40 to which the motor case 5 is attached, and a worm reduction gear mechanism 41 accommodated in the gear case 40. The gear case 40 is formed of a material having excellent heat dissipation, such as aluminum die cast. The gear case 40 is formed in a box shape having an opening portion 40a on one surface thereof and has a gear accommodating portion 42 which accommodates the worm reduction gear mechanism 41 therein. Further, an opening 43 that provides communication between the through hole 10a of the first motor case 6 and the gear accommodating portion 42 is formed in a side wall 40b of the gear case 40 at a place at which the first motor case 6 is formed integrally therewith.

Also, a bottom wall 40c of the gear case 40 is provided with a substantially cylindrical bearing boss 49. The bearing boss 49 is for rotatably supporting an output shaft 48 of the worm reduction gear mechanism 41 and has a slide bearing (not shown) provided on an inner circumferential surface thereof. Further, an O-ring (not shown) is attached to an inner circumferential edge of a tip of the bearing boss 49. This prevents dust and water from entering to the inside from the outside through the bearing boss 49. In addition, a plurality of ribs 52 are provided on an outer peripheral surface of the bearing boss 49. This ensures rigidity of the bearing boss 49.

The worm reduction gear mechanism 41 accommodated in the gear accommodating portion 42 is configured of a worm shaft 44 and a worm wheel 45 that engages with the worm shaft 44. The worm shaft 44 is disposed coaxially with the shaft 31 of the motor unit 2. In addition, both ends of the worm shaft 44 are rotatably supported by bearings 46 and 47 provided on the gear case 40. An end portion of the worm shaft 44 on the motor unit 2 side protrudes to reach the opening 43 of the gear case 40 via the bearing 46. This protruding end portion of the worm shaft 44 and an end portion of the shaft 31 of the motor unit 2 are joined together, and the worm shaft 44 and the shaft 31 are integrated with each other. Also, the worm shaft 44 and the shaft 31 may be formed integrally with each other by molding a worm shaft portion and a shaft portion with one base material.

The worm wheel 45 engaged with the worm shaft 44 is provided with an output shaft 48 at a radial center of the worm wheel 45. The output shaft 48 is disposed coaxially with a direction of a rotation axis of the worm wheel 45 and protrudes outside the gear case 40 via the bearing boss 49 of the gear case 40. A spline 48a that can be connected to an electric component (not shown) is formed at a protruding tip of the output shaft 48.

Further, a sensor magnet (not shown) is provided at the radial center of the worm wheel 45 on a side opposite to a side on which the output shaft 48 projects. The sensor magnet constitutes one part of a rotational position detection unit 60 that detect a rotational position of the worm wheel 45. A magnetic detection element 61, which constitutes the other part of the rotational position detection unit 60, is provided in the controller unit 4 which is disposed to face the worm wheel 45 on the sensor magnet side of the worm wheel 45 (on the opening portion 40a side of the gear case 40).

(Controller Unit)

The controller unit 4 that controls driving of the motor unit 2 includes a controller board 62 on which the magnetic detection element 61 is mounted, and a cover 63 provided to close the opening portion 40a of the gear case 40. In addition, the controller board 62 is disposed to face the sensor magnet side of the worm wheel 45 (the opening portion 40a side of the gear case 40).

The controller board 62 is a board obtained by forming a plurality of conductive patterns (not shown) on a so-called epoxy board. Terminal portions of the coils 24 pulled out from the stator core 20 of the motor unit 2 are connected to the controller board 62, and terminals (not shown) of a connector 11 provided on the cover 63 are electrically connected to the controller board 62. Also, in addition to the magnetic detection element 61, a power module (not shown) including a switching element such as a field effect transistor (FET) that controls a current supplied to the coils 24 is mounted on the controller board 62. Further, a capacitor (not shown) that smooths a voltage applied to the controller board 62 and the like are mounted on the controller board 62.

The cover 63 that covers the controller board 62 configured as described above is made of a resin. Also, the cover 63 is formed to protrude slightly outward. In addition, an inner surface side of the cover 63 serves as a controller accommodating portion 56 that accommodates the controller board 62 and the like.

Moreover, the connector 11 is formed integrally on an outer circumferential portion of the cover 63. The connector 11 is formed such that it can be fitted and attached to a connector extending from an external power source (not shown). In addition, the controller board 62 is electrically connected to terminals of the connector 11. As a result, electric power from the external power supply is supplied to the controller board 62.

Further, a fitting portion 81 that is fitted to an end portion of the side wall 40b of the gear case 40 is formed to project at an opening edge of the cover 63. The fitting portion 81 is configured of two walls 81a and 81b along the opening edge of the cover 63. In addition, the end portion of the side wall 40b of the gear case 40 is inserted (fitted) between these two walls 81a and 81b. Thus, a labyrinth portion 83 is formed between the gear case 40 and the cover 63. The labyrinth portion 83 prevents dust and water from entering through between the gear case 40 and the cover 63. Also, fixation of the gear case 40 and the cover 63 is performed by fastening bolts (not shown).

(Operation of Wiper Motor)

Next, an operation of the wiper motor 1 will be described.

In the wiper motor 1, the electric power supplied to the controller board 62 via the connector 11 is selectively supplied to each of the coils 24 of the motor unit 2 via the power module (not shown). Then, a predetermined interlinking magnetic flux is formed in the stator 8 (teeth 22), and a magnetic attractive or repulsive force is generated between the interlinkage magnetic flux and effective magnetic fluxes formed by the permanent magnets 33 of the rotor 9. As a result, the rotor 9 continuously rotates.

When the rotor 9 rotates, the worm shaft 44 integrated with the shaft 31 rotates, and the worm wheel 45 engaged with the worm shaft 44 also rotates. Then, the output shaft 48 connected to the worm wheel 45 rotates, and a desired electric component (for example, a wiper driving device mounted on a vehicle) is driven.

Further, detection results on the rotational position of the worm wheel 45 detected by the magnetic detection element 61 mounted on the controller board 62 are output as signals to an external device (not shown). A switching timing of the switching element and the like of the power module (not shown) is controlled by the external device (not shown) on the basis of rotational position detection signals of the worm wheel 45 and thus control for driving the motor unit 2 is performed. Also, control for outputting driving signals of the power module and driving the motor unit 2 may be performed by the controller unit 4.

(Operations and Effects of Rotor)

Next, operations and effects of the rotor 9 will be described.

Here, the rotor 9 is a so-called surface permanent magnet (SPM) type rotor in which the permanent magnets 33 are disposed on the outer peripheral surface 32*b* of the rotor core 32. For this reason, an inductance value in the direction of d axis can be reduced. In addition to this, in the rotor 9, the projecting poles 35 are provided between the permanent magnets 33 that are adjacent to each other in the circumferential direction. As a result, an inductance value in the direction of q axis resulting from the interlinkage magnetic flux of the stator 8 can be increased as compared with a case of not including the projecting poles 35. Therefore, the rotor 9 is rotated by also utilizing a difference in reluctance torque between the direction of d axis and the direction of the q axis.

As described above, by providing the projecting poles 35, the reluctance torque can contribute to a rotation torque of the rotor 9 while the magnetic fluxes of the permanent magnets 33 leak to the projecting poles 35. For this reason, magnetic fluxes are also formed in the projecting poles 35.

On the other hand, the stator core 20 of the stator 8 is formed by stacking a plurality of electromagnetic steel sheets in the axial direction. For this reason, the electric resistance can be increased with respect to magnetic fluxes flowing in the stator core 20 in the radial direction among the magnetic fluxes of the projecting poles 35. Therefore, eddy currents of the stator core 20 can be reduced for the magnetic fluxes of the projecting poles in the radial direction.

Also, the axial thickness Ts of the stator 8, the axial thickness Tr of the rotor core 32, and the axial thickness Tm of the permanent magnet 33 are set to satisfy the above equation (1). For this reason, the projecting poles 35 do not project outward in the axial direction from both axial ends of the stator core 20. Therefore, it is possible to inhibit the magnetic fluxes at both axial ends of the projecting pole 35 from flowing toward both axial ends of the stator core 20.

Figure 7:
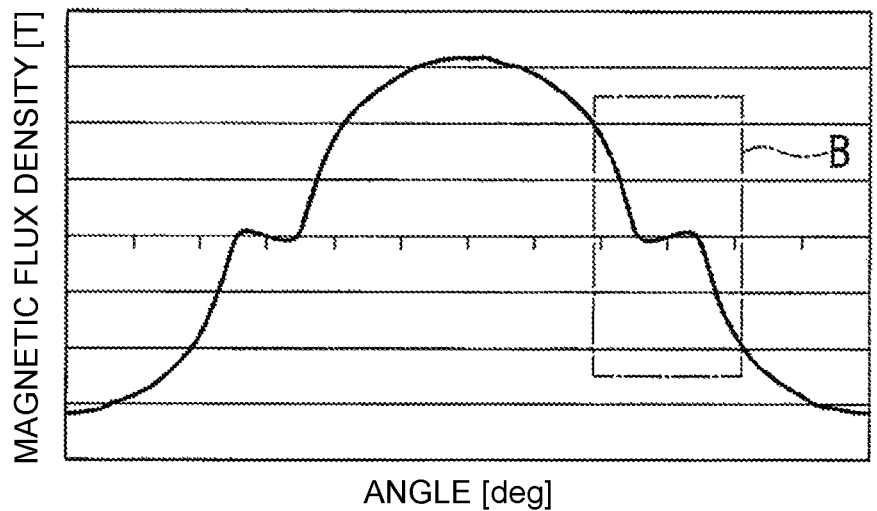
FIG. 7 is a graph showing a change in surface magnetic flux density at an axial end of a projecting pole in the embodiment of the present invention.

FIG. 7 is a graph showing a change in surface magnetic flux density of the axial end 35*h* of the projecting pole 35 in which the vertical axis is a surface magnetic flux density of the axial end 35*h* (see FIG. 4) of the projecting pole 35 of the rotor 9 and the horizontal axis is a rotation angle of the rotor 9.

As shown in part B in FIG. 7, it can be confirmed that a change in magnetic flux due to the axial end 35*h* is inhibited at the axial end 35*h* of the projecting pole 35. For this reason, an order of a cogging torque of the motor unit 2 can be reduced, and thus iron loss of the stator 8 can be reduced.

By satisfying the above equation (1), both axial ends 33*h* of the permanent magnet 33 project further outward in the axial direction than both axial ends 32*c* of the rotor core 32 (projecting pole 35) and both axial ends 8*a* of the stator 8. For this reason, an amount of effective magnetic flux of the rotor 9 can be increased.

Figure 8:
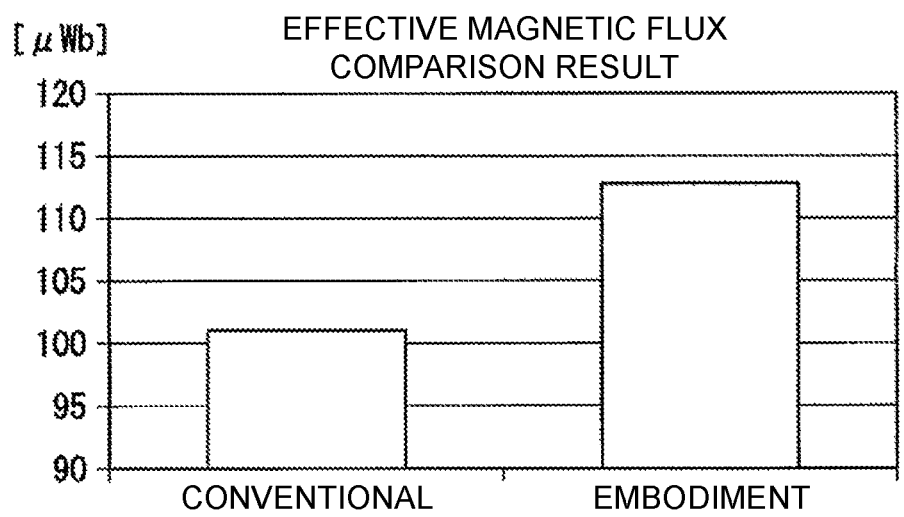
FIG. 8 is a graph for comparing an amount of effective magnetic flux of the rotor in the embodiment of the present invention with an amount of effective magnetic flux of a conventional rotor.

FIG. 8 is a graph for comparing an amount of effective magnetic flux [μWb] of a conventional rotor with an amount of effective magnetic flux [μWb] of the rotor 9 of the present embodiment. Also, the conventional rotor in FIG. 8 refers to a type in which the axial thickness of the stator 8 is the same as the axial thickness of the permanent magnet 33 and both axial ends 33*h* of the permanent magnet 33 do not protrude from both axial ends 8*a* of the stator 8.

As shown in FIG. 8, it can be confirmed that the amount of effective magnetic flux of the rotor 9 of the present embodiment is increased as compared with the conventional one. For this reason, the interlinking magnetic flux formed in the stator 8 can be caused to efficiently contribute to the rotation force of the rotor 9, and thus motor efficiency of the motor unit 2 can be increased.

Also, the groove portion 91 is formed at the end portion 35*t* of the projecting pole 35 of the rotor 9. Thus, when the entire end portion 35*t* of the projecting pole 35 is viewed, an interval between the end portion 35*t* and each of the teeth 22 (collar portion 102) of the stator 8 can be formed to be uneven. That is, the interval between the end portion 35*t* of the projecting pole 35 and each of the teeth 22 becomes larger at a place at which the groove portion 91 is formed, but becomes smaller at a place at which the groove portion 91 is not formed. As a result, it is possible to inhibit a sudden increase in the magnetic flux density generated in the teeth 22 (collar portion 102) before and after the projecting poles 35 pass through between the teeth 22 during rotation of the rotor 9.

Also, the projecting pole 35 of the rotor core 32 is formed such that the circumferential width dimension becomes 20 degrees or more and 40 degrees or less in electrical angle θ. Here, the circumferential width dimension of the salient pole 35 refers to an angle formed by two straight lines L2 that respectively connect two radial corner portions 35*b* of the projecting pole 35 and the axial center C1 of the shaft 31. In this way, by setting the circumferential width dimension of the projecting pole 35 at 40 degrees or less in the electrical angle θ, the inductance value in the direction of the q axis can be reduced. This makes it possible to inhibit the demagnetizing field and obtain a high reluctance torque. Hereinafter, it will be described more specifically.

Figure 9:
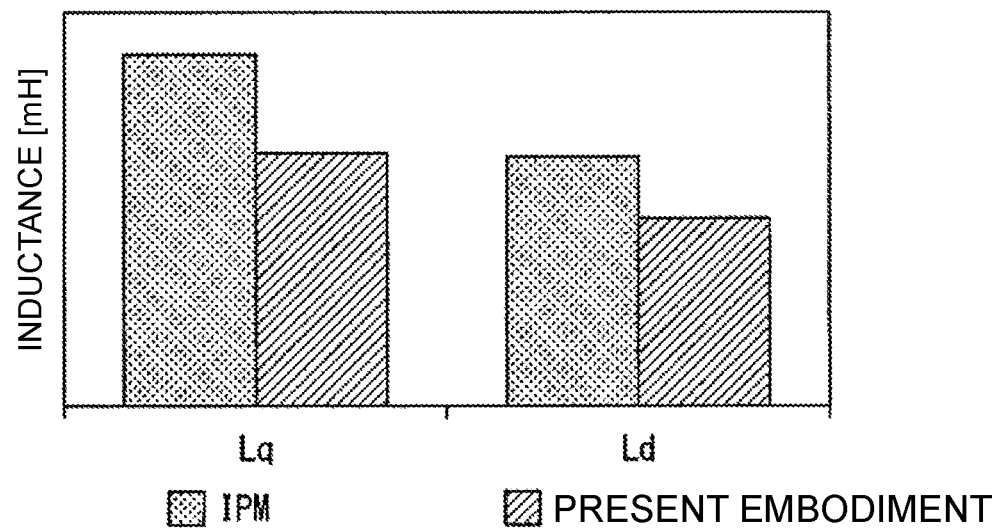
FIG. 9 is a graph showing q axis and d axis inductance of the rotor according to the embodiment of the present invention, which is compared with a rotor having a conventional structure.

FIG. 9 is a graph showing q axis and d axis inductances Lq and Ld [mH] of the rotor 9, in which the rotor 9 of the present embodiment is compared with a rotor having a conventional structure. Also, the conventional structure mentioned here is a structure of a rotor of a so-called interior permanent magnet (IPM) type motor in which permanent magnets are disposed in a plurality of slits formed in a rotor core.

As shown in the figure, it can be confirmed that the rotor 9 of the present embodiment has smaller inductance values on both the q axis and the d axis as compared with the conventional structure.

Figure 10:
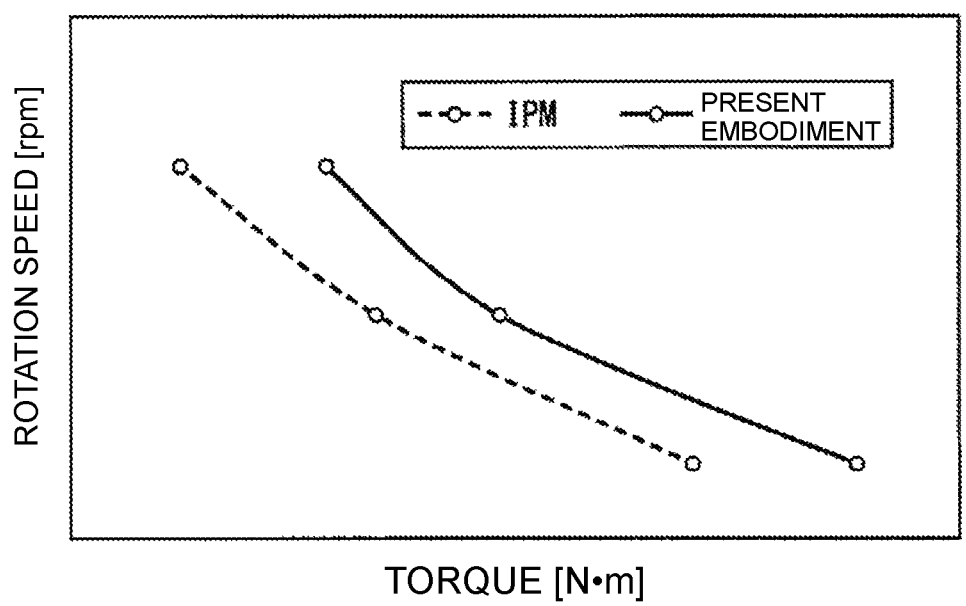
FIG. 10 is a graph showing a change in rotation speed of the rotor according to the embodiment of the present invention, which is compared with a rotor having a conventional IPM structure.

FIG. 10 is a graph showing a change in rotation speed of the rotor 9 in which the vertical axis represents a rotation speed [rpm] of the rotor 9 and the horizontal axis represents s torque [N·m] of the rotor 9. More specifically, FIG. 10 is a graph showing a correlation between the torque [N·m] and the rotation speed [rpm] in a case in which advance angle energization and wide angle energization are performed on the rotor 9, in which the rotor 9 of the present embodiment is compared with the conventional rotor having an IPM structure.

As shown in the figure, it can be confirmed that the rotor 9 of the present embodiment generates a higher torque and a higher rotation speed than those of the conventional structure.

Figure 11:
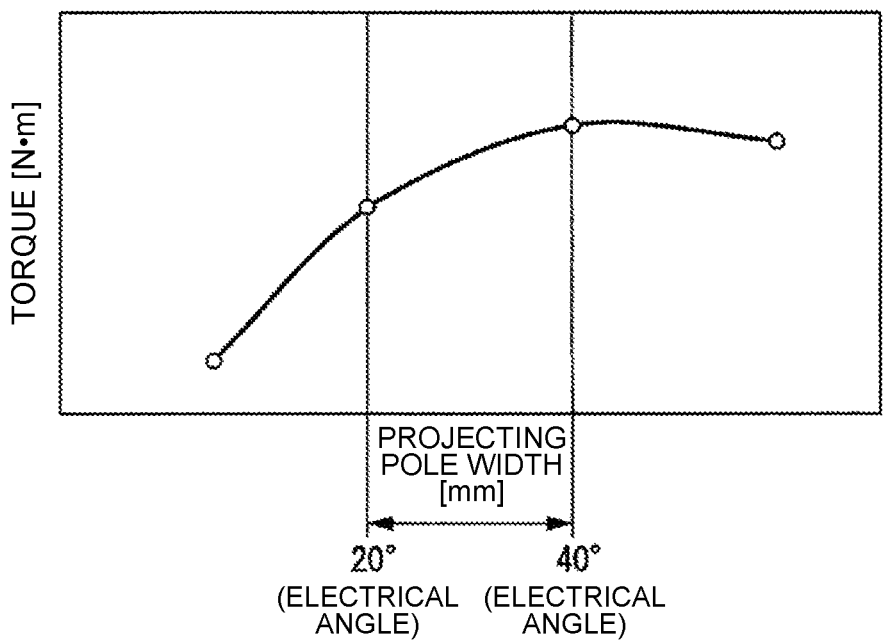
FIG. 11 is a graph showing a change in torque of the rotor for each projecting pole width of the projecting poles in the embodiment of the present invention.

FIG. 11 is a graph showing a change in torque of the rotor 9 in which the vertical axis represents the torque [N·m] of the rotor 9 and the horizontal axis represents a projecting pole width [mm] of the projecting pole 35 provided on the rotor core 32. More specifically. FIG. 11 is a graph showing the torque generated in the rotor 9 of the present embodiment in a case in which the circumferential width dimension (electrical angle θ) of the projecting pole 35 is changed.

Figure 12:
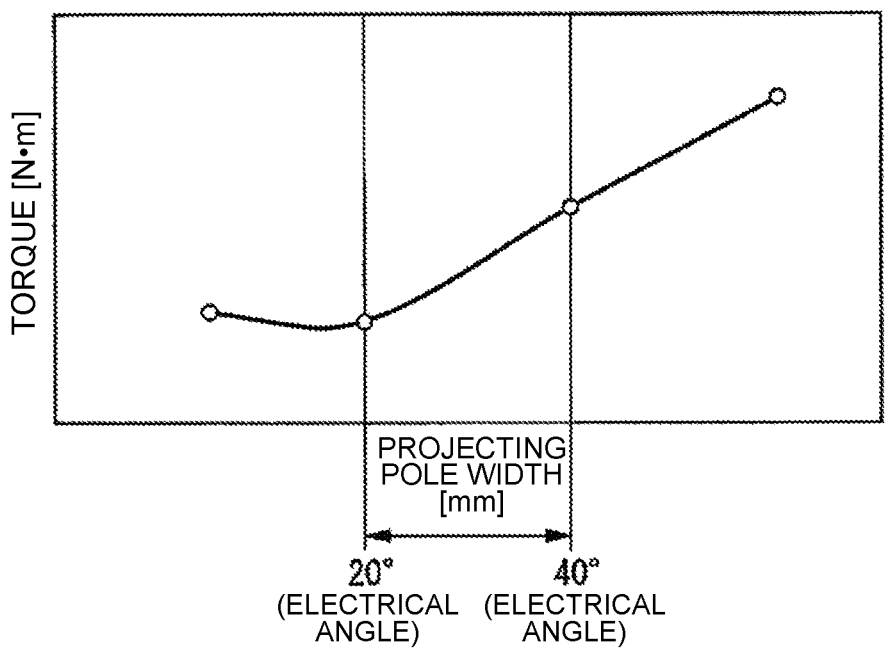
FIG. 12 is a graph showing a change in ripple rate of the rotor for each projecting pole width of the projecting poles in the embodiment of the present invention.

FIG. 12 is a graph showing a change in ripple rate of the rotor 9 in which the vertical axis represents a ripple rate [%] of the rotor 9 and the horizontal axis represents the projecting pole width [mm] of the projecting poles 35 of the rotor core 32. More specifically, FIG. 12 is a graph showing the ripple rate generated in the rotor 9 of the present embodiment in a case in which the circumferential width dimension of the projecting pole 35 varies.

Figure 13:
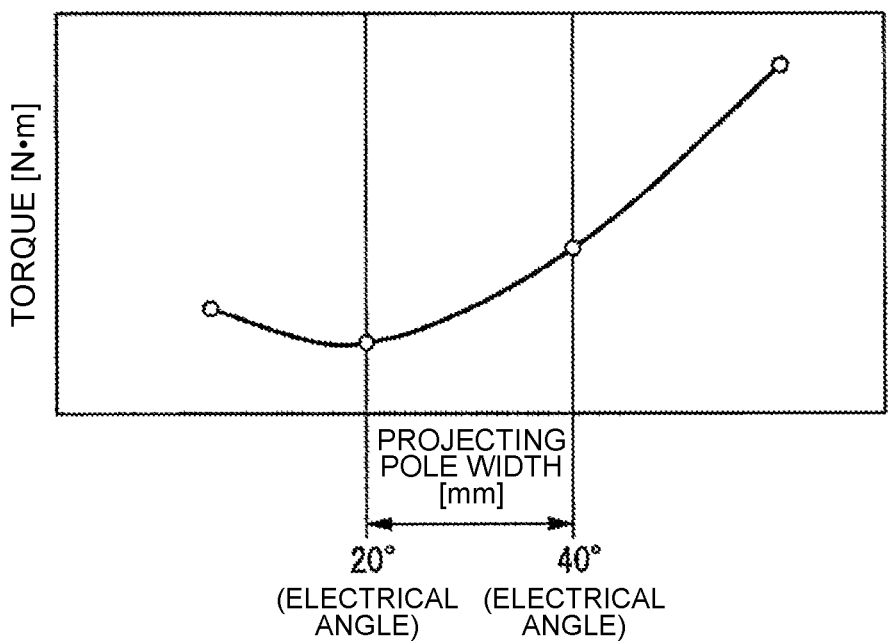
FIG. 13 is a graph showing a change in cogging of the rotor for each projecting pole width of the projecting poles in the embodiment of the present invention.

FIG. 13 is a graph showing a change in cogging of the rotor 9 in which the vertical axis represents a cogging [mN·m] of the rotor 9 and the horizontal axis represents the projecting pole width [mm] of the projecting pole 35 of the rotor core 32. More specifically. FIG. 13 is a graph showing the cogging generated in the rotor 9 of the present embodiment in a case in which the circumferential width dimension of the projecting pole 35 varies.

As shown in FIGS. 11 to 13, in the rotor 9 of the present embodiment, a high reluctance torque can be obtained when the circumferential width dimension of the projecting pole 35 is 3 mm (electrical angle θ=20 degrees) to 5 mm (electrical angle θ=40 degrees). Further, it can be confirmed that the ripple rate and the cogging torque of the motor unit 2 can be inhibited.

In this way, by setting the electrical angle θ of the projecting pole 35 to 40 degrees or less and reducing the circumferential width dimension of the projecting pole 35 in the circumferential direction, the inductance value in the direction of the q axis can be reduced, and the demagnetizing field can be inhibited. In addition, by setting the electrical angle θ of the projecting pole 35 to 20 degrees or more to secure the circumferential width dimension at a certain value or more and thereby concentrating the magnetic flux into the projecting pole 35, an effect of making the demagnetizing field difficult to act on the end portion 33*s* of the permanent magnet 33 can be surely obtained. Further, by setting the electrical angle θ of the projecting pole 35 to 20 degrees or more and 40 degrees or less, a high reluctance torque can be obtained.

Also, by using the permanent magnets 33 instead of rare earth magnets for the rotor 9, it is possible to inhibit an increase in cost accompanying an increase in magnet usage amount even when a radial dimension of the permanent magnet 33 is increased.

Further, in one permanent magnet 33, the inclined surfaces 33*e* on both sides in the circumferential direction are parallel to the straight line L connecting the circumferential intermediate portion 33*c* of the permanent magnet 33 and the axial center C1 of the shaft 31. For this reason, the two inclined surfaces 33*e* are also parallel to each other. With this configuration, manufacturing of the permanent magnet 33 can be facilitated, and the cost of the permanent magnet 33 can be reduced. More specifically, the permanent magnet 33 can be formed from a material having two parallel inclined surfaces 33*e* as two sides facing each other, and thus manufacturing cost of the permanent magnet 33 can be reduced.

Also, the projecting pole 35 is formed such that both side surfaces 35*c* facing each other in the circumferential direction are parallel to each other. That is, the projecting pole 35 is formed such that the circumferential width dimension is uniform in the radial direction. For this reason, for example, saturation of the magnetic flux flowing through the projecting pole 35 can be inhibited as compared with the case in which the projecting pole 35 is trapezoidal when viewed in the direction of the rotation axis.

Further, the present invention is not limited to the embodiment described above, and includes various modifications of the embodiment described above without departing from the spirit of the present invention.

For example, although the wiper motor 1 is exemplified as an example of the motor in the embodiment described above, the motor according to the present invention is not limited to the wiper motor 1 and can be used as a drive source for an electric component (for example, a power window, a sunroof, an electric seat, or the like) mounted on a vehicle) and various other purposes.

Also, in the embodiment described above, the case in which one groove portion 91 is formed at substantially the circumferential center of the radially outer end portion 35*t* of the projecting pole 35 over the entire length in the axial direction has been described. However, the present invention is not limited thereto, and two or more groove portions 91 may be formed in the end portion 35*t* of the projecting pole 35.

In addition, the case in which the groove portion 91 is formed in substantially a V groove shape such that the circumferential groove width becomes gradually narrower toward the inner side in the radial direction has been described. However, the present invention is not limited thereto, and the groove portion 91 may be allowed as long as the circumferential groove width is formed to be gradually narrower toward the inner side in the radial direction, and the groove portion 91 may be formed in substantially a U shape, for example.

Also, the case in which the inclined surface 33*e* formed on the permanent magnet 33 is formed to be oblique and flat to gradually separate from the projecting pole 35 toward the outer peripheral surface 33*a* of the permanent magnet 33 from the radially outer end of the projecting pole contact surface 33*d* has been described. However, the inclined surface 33*e* may be allowed as long as it is formed to gradually separate from the projecting pole 35 toward the outer peripheral surface 33*a* of the permanent magnet 33 from the radially outer end of the projecting pole contact surface 33*d*. For example, the inclined surface 33*e* may be formed in a curved shape.

Figure 14:
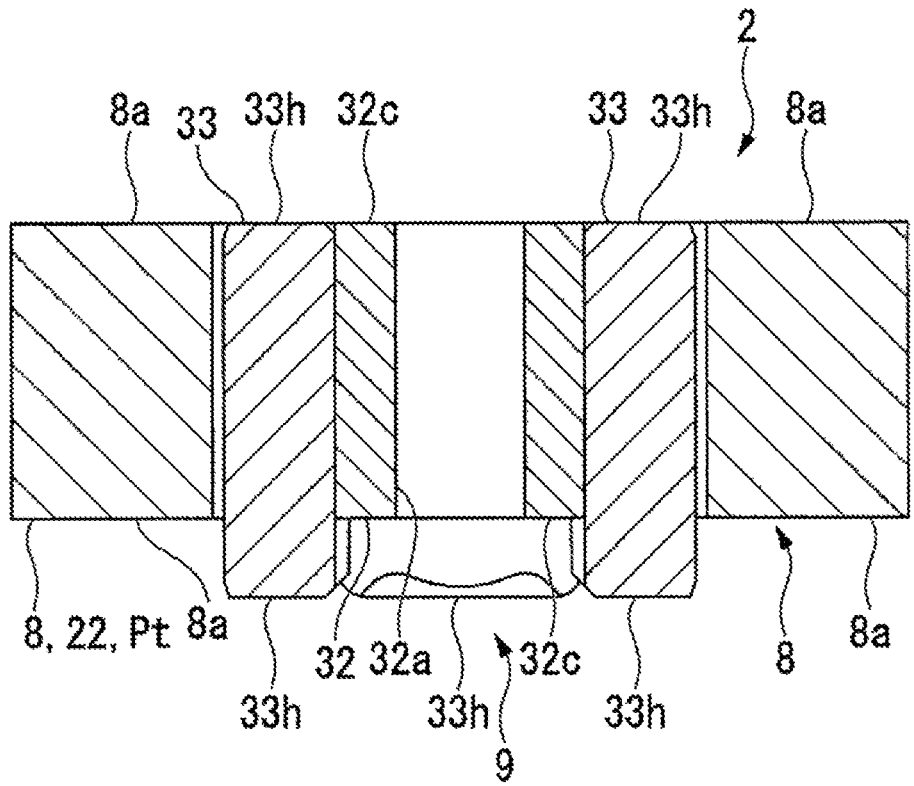
FIG. 14 is a cross-sectional view along the axial direction of a stator and a rotor in a modified example of the embodiment of the present invention.

Also, in the embodiment described above, the case in which the axial thickness Ts of the stator 8, the axial thickness Tr of the rotor core 32, and the axial thickness Tm of the permanent magnet 33 are set to satisfy the above equation (1) has been described. In addition, the case in which both axial ends 33*h* of the permanent magnet 33 project further outward in the axial direction than both axial ends 32*c* of the rotor core 32 (projecting pole 35) and both axial ends 8*a* of the stator 8 has been described. However, the present invention is not limited thereto, and as shown in FIG. 14, it may be allowed as long as at least one end portion 33*h* of both axial ends 33*h* of the permanent magnet 33 projects from both axial ends 8*a* of the stator 8.

Further, the axial thickness Ts of the stator 8, and the axial thickness Tr of the rotor core 32 may not be set to be substantially the same as in the above equation (1), but be set to satisfy the following equation.

$$Tr>Ts \qquad (2)$$

Figure 15:
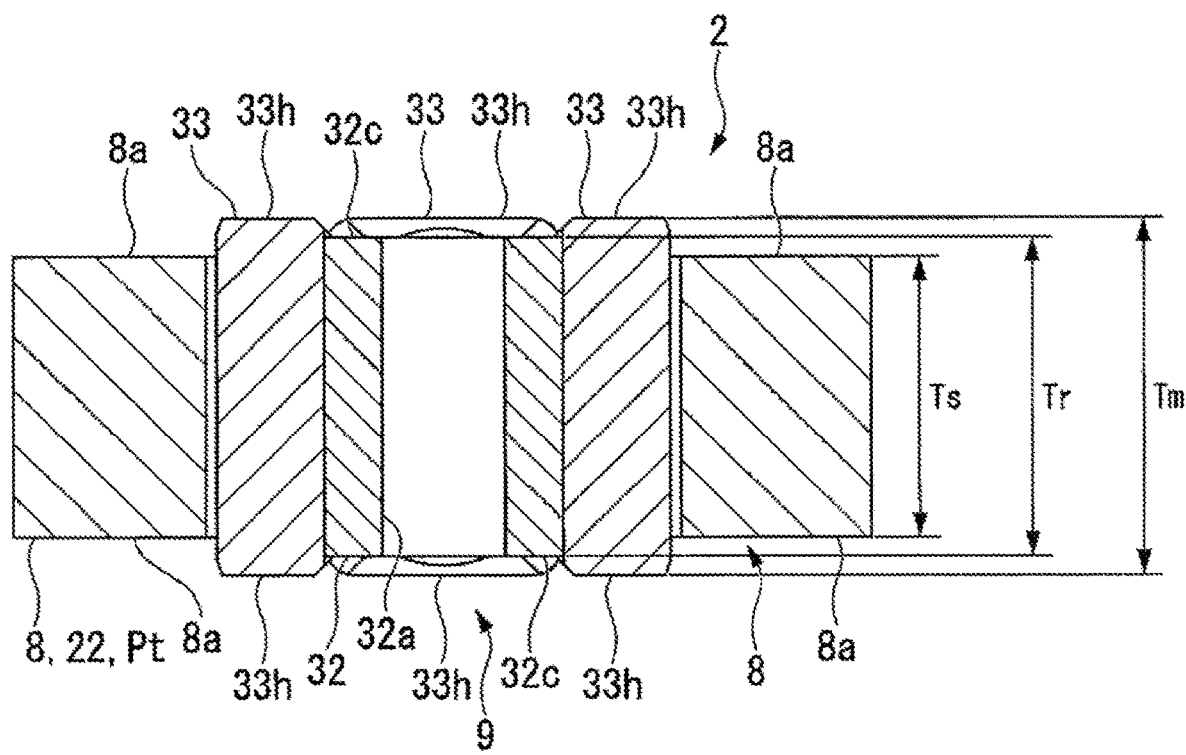
FIG. 15 is a cross-sectional view in an axial direction of a stator and a rotor in a modified example of the embodiment of the present invention.
Figure 16:
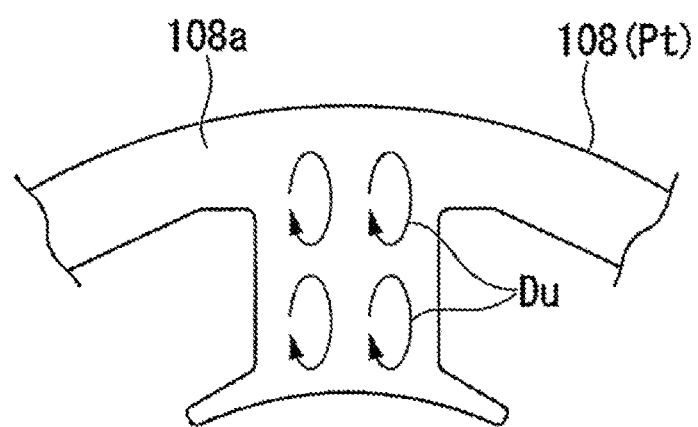
FIG. 16 is a plan view of a part of a conventional stator in an axial direction thereof.
Figure 17:
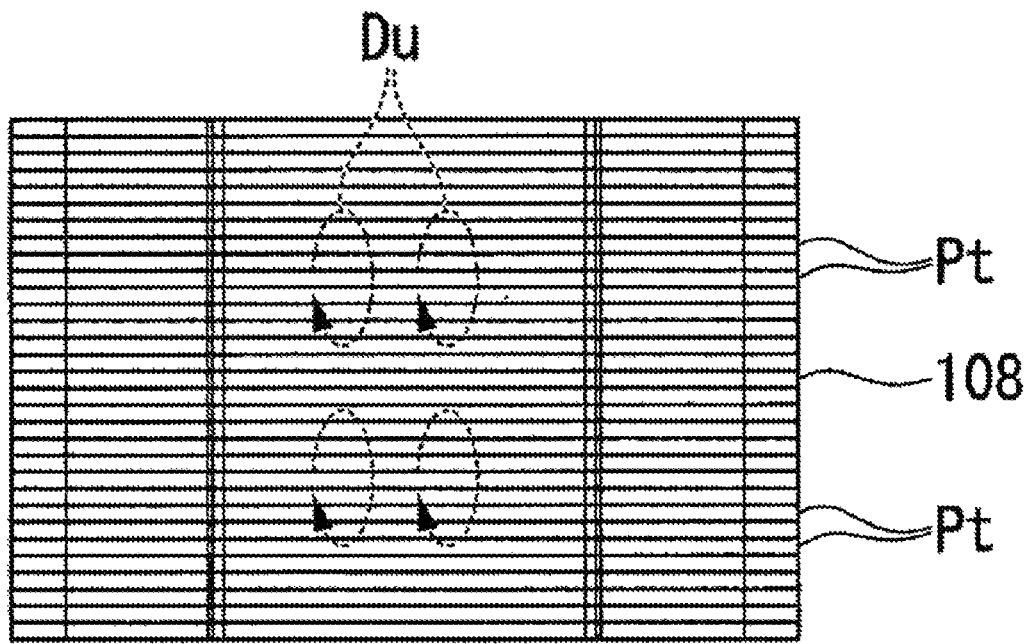
FIG. 17 is a side view of the conventional stator in a radial direction thereof.
Figure 18:
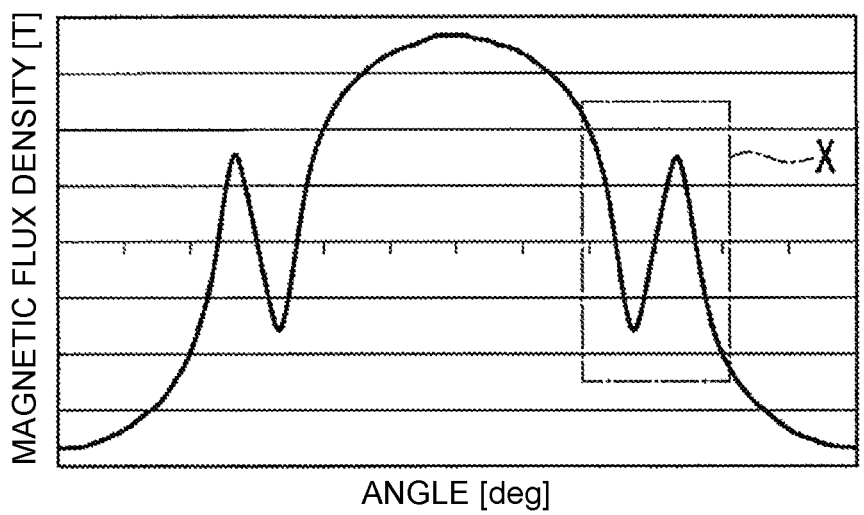
FIG. 18 is a graph showing a change in surface magnetic flux density in a conventional rotor.

That is, as shown in FIG. 15, the axial thickness Ts of the stator 8, the axial thickness Tr of the rotor core 32, and the axial thickness Tm of the permanent magnet 33 may be set to satisfy the following equation.

$$Tm>Tr>Ts \qquad (3)$$

Even in the case of such a configuration, the axial end 33h of the permanent magnet 33 protrudes outward in the axial direction from the axial end 35h of the projecting pole 35, and the axial end 33h of the permanent magnet 33 protrudes outward in the axial direction from the axial end 8a of the stator 8. For this reason, the same effect as that of the embodiment described above is obtained.

What is claimed is:

1. A motor comprising:
 a stator which comprises an annular stator core, and a plurality of teeth protruding radially inward from an inner circumferential surface of the stator core;
 coils which are wound around the teeth;
 a shaft which rotates inside the stator core in a radial direction thereof;
 a rotor core which is affixed to the shaft and radially centered on a rotation axis of the shaft;
 a plurality of permanent magnets disposed on an outer peripheral surface of the rotor core; and
 projecting poles which are formed to project radially outward between the permanent magnets adjacent to each other in a circumferential direction of the outer peripheral surface of the rotor core and with which circumferential side surfaces of the permanent magnets are brought into contact,
 wherein the stator is formed by stacking a plurality of steel sheets in a direction of the rotation axis of the shaft, and
 at least one end portion of both ends of each permanent magnet projects further outward in the direction of the rotation axis than an end portion of the rotor core in the direction of the rotation axis such that the at least one end portion protrudes away from the rotor core in the direction of the rotation axis.

2. The motor according to claim 1, wherein a thickness of the stator in the direction of the rotation axis and a thickness of the rotor core in the direction of the rotation axis are the same.

3. The motor according to claim 1, wherein when a thickness of the stator in the direction of the rotation axis is defined as Ts, a thickness of the rotor core in the direction of the rotation axis is defined as Tr, and a thickness of the permanent magnet in the direction of the rotation axis is defined as Tm, the thicknesses Ts, Tr, and Tm are set to satisfy a correlation of Tm>Tr>Ts.

4. The motor according to claim 1, wherein a circumferential width dimension of a radially outer end portion of the projecting pole is 40 degrees or less in electrical angle.

5. The motor according to claim 1, wherein a circumferential width dimension of a radially outer end portion of the projecting pole is 20 degrees or more in electrical angle.

6. The motor according to claim 1,
 wherein one groove portion is formed on a radially outer end surface of the projecting pole in the direction of the rotation axis, and
 the groove portion is formed such that a circumferential groove width thereof becomes gradually narrower toward an inner side in the radial direction.

7. A brushless wiper motor comprising the motor according to claim 1.

8. The motor according to claim 2, wherein a circumferential width dimension of a radially outer end portion of the projecting pole is 40 degrees or less in electrical angle.

9. The motor according to claim 3, wherein a circumferential width dimension of a radially outer end portion of the projecting pole is 40 degrees or less in electrical angle.

10. The motor according to claim 2, wherein a circumferential width dimension of a radially outer end portion of the projecting pole is 20 degrees or more in electrical angle.

11. The motor according to claim 3, wherein a circumferential width dimension of a radially outer end portion of the projecting pole is 20 degrees or more in electrical angle.

12. The motor according to claim 4, wherein a circumferential width dimension of a radially outer end portion of the projecting pole is 20 degrees or more in electrical angle.

13. The motor according to claim 8, wherein a circumferential width dimension of a radially outer end portion of the projecting pole is 20 degrees or more in electrical angle.

14. The motor according to claim 9, wherein a circumferential width dimension of a radially outer end portion of the projecting pole is 20 degrees or more in electrical angle.

15. The motor according to claim 2,
 wherein one groove portion is formed on a radially outer end surface of the projecting pole in the direction of the rotation axis, and
 the groove portion is formed such that a circumferential groove width thereof becomes gradually narrower toward an inner side in the radial direction.

16. The motor according to claim 3,
 wherein one groove portion is formed on a radially outer end surface of the projecting pole in the direction of the rotation axis, and
 the groove portion is formed such that a circumferential groove width thereof becomes gradually narrower toward an inner side in the radial direction.

17. The motor according to claim 4,
 wherein one groove portion is formed on a radially outer end surface of the projecting pole in the direction of the rotation axis, and
 the groove portion is formed such that a circumferential groove width thereof becomes gradually narrower toward an inner side in the radial direction.

18. The motor according to claim 5,
 wherein one groove portion is formed on a radially outer end surface of the projecting pole in the direction of the rotation axis, and
 the groove portion is formed such that a circumferential groove width thereof becomes gradually narrower toward an inner side in the radial direction.

19. The motor according to claim 8,
 wherein one groove portion is formed on a radially outer end surface of the projecting pole in the direction of the rotation axis, and
 the groove portion is formed such that a circumferential groove width thereof becomes gradually narrower toward an inner side in the radial direction.

20. The motor according to claim 9,
 wherein one groove portion is formed on a radially outer end surface of the projecting pole in the direction of the rotation axis, and the groove portion is formed such that a circumferential groove width thereof becomes gradually narrower toward an inner side in the radial direction.

* * * * *